United States Patent [19]

Dunn et al.

[11] Patent Number: 4,548,127
[45] Date of Patent: Oct. 22, 1985

[54] PISTON FOR INTERNAL COMBUSTION ENGINE

[76] Inventors: Stephen J. Dunn, 22 Wood Gate, Helpston; Alan W. Sparrow, 18 Amanda Ct., Thorpe Lea Rd., both of Peterborough, England

[21] Appl. No.: 520,030

[22] Filed: Aug. 3, 1983

Related U.S. Application Data

[63] Continuation-in-part of Ser. No. 261,222, May 8, 1981, abandoned.

[51] Int. Cl.$^4$ .................................................. F16J 1/04
[52] U.S. Cl. ........................................ 92/220; 92/216; 92/221; 123/193 P
[58] Field of Search ............... 92/220, 221, 216, 213, 92/224; 123/193 P, 669; 411/389, 388, 412, 413

[56] References Cited

U.S. PATENT DOCUMENTS

| Re. 18,834 | 3/1932 | Nelson | 92/221 X |
|---|---|---|---|
| 1,514,506 | 11/1924 | Cook | 92/221 X |
| 1,995,746 | 3/1935 | Nelson | 92/221 X |
| 2,219,989 | 10/1940 | Gimm | 92/221 X |
| 2,806,750 | 9/1957 | Gehres | 92/220 X |
| 3,520,234 | 7/1970 | Hill et al. | 92/220 |
| 4,018,132 | 4/1977 | Abe | 411/413 |
| 4,073,221 | 2/1978 | Goloff | 92/221 |

FOREIGN PATENT DOCUMENTS

| 756979 | 10/1933 | France | 411/389 |
|---|---|---|---|
| 148612 | 12/1978 | Japan | 123/193 P |
| 423576 | 4/1933 | United Kingdom | 92/221 |

Primary Examiner—Edward K. Look
Attorney, Agent, or Firm—Robert L. Farris

[57] ABSTRACT

A piston for an internal combustion engine comprising a piston body (1) and a crown portion (3) that are connected by anchoring means comprising elongate members (7,23,26,79,80) that extend from the crown portion (3) into the piston body (1) so as to transmit tensile and compressive loads from the crown to a portion of the piston body in a region spaced axially away from the crown portion at a temperature which, at maximum operating temperatures, is low enough to prevent loosening of the anchoring means, characterized in that co-operating surfaces of said anchoring means (7,9,16) and piston body (1) are pre-loaded into contact with one another by virtue of mechanically applied strain energy stored in the anchoring means and piston body (1) and which acts axially to prevent parting of said co-operating surfaces by said tensile and compressive loads without being dependent on any reaction forces between the adjacent faces of the crown portion and piston body.

10 Claims, 27 Drawing Figures

PISTON FOR INTERNAL COMBUSTION ENGINE

This is a continuation-in-part of application Ser. No. 261,222, filed May 8, 1981, and now abandoned.

TECHNICAL FIELD

This invention relates to pistons for internal combustion engines.

It is known to construct pistons for internal combustion engines so that they have a separate crown portion which is attached to the body of the piston. For example, it is known to provide a crown portion formed with a combustion chamber or to provide a ring-shaped insert to form the lip of a combustion in the crown of a piston. The crown portion or insert is preferably composed of a material particularly suited to the thermal and gas pressure conditions to which the crown is exposed in operation.

The crown portion or insert may be attached to the body of the piston by casting the body around or against it so that the two are keyed together. A technique of this type is used in the piston disclosed in our U.S. Pat. No. 4,140,096 in which an insert is provided with legs that are embedded in the body of the piston by casting the body around the insert and legs. Furthermore the legs are such as to extend from the insert into a portion of the body, the temperature of which, at maximum operating temperatures, is such that loosening of the member in that portion is prevented. Alternate tensile and compressive loads are transmitted through the legs to said portion of the body when the piston is in operation.

Alternatively, the crown portion or insert may be attached to the pre-formed body of the piston using separate threaded attachment means such as bolts, screws or studs that clamp the crown portion or insert against the body of the piston.

Examples of the use of clamping screws are shown in U.S. Pat. No. 1,547,737 and 2,104,347. The effectiveness of the clamping action of the screws is dependent upon the screws being held in tension by the reaction force between the inter-engaging surfaces of the crown portion and piston body and is impaired by relative thermal expansion between the screws and piston that will release the tension, allowing free play of the piston crown and screws, which in turn results in damage to the piston. Also, the inter-engaging surfaces of the crown portion and pistion body are subjected to thermal yielding that releases the tension in the screws. This effect is increased by the forces of combustion that are exerted on the crown portion in operation and cause compressive forces to be applied directly to the piston body through said inter-engaging surfaces.

DISCLOSURE OF THE INVENTION

An object of the present invention is to provide a piston in which a crown portion or insert is attached to the preformed body of the piston by anchoring means that avoids the aforesaid disadvantages of the known clamping technique.

A piston according to the invention comprises a piston body and a crown portion that are connected by anchoring means comprising a number of elongate members each extending through a bore in the piston body and being rigidly connected axially to the crown portion and to a portion of the piston body at respective opposite ends so as to transmit tensile and compressive loads from the crown to said portion of the piston body in a region spaced axially away from the crown portion at a temperature which, at maximum operating temperatures, is low enough to prevent loosening of the anchoring means, the co-operating surfaces of each elongate member and piston body being pre-loaded into contact with one another by virtue of mechanically applied strain energy stored in the anchoring means and pistons body and which acts axially to prevent parting of said co-operating surfaces by said tensile and compressive loads.

The invention therefore uses elongate anchoring members that are rigidly connected axially between the crown portion and piston body so as to transmit both tensile and compressive loads between the crown portion and a cooler portion of the body portion spaced away from the crown portion, thereby avoiding any dependence on contact and the reaction forces between the adjacent faces of the crown portion and piston body.

The invention also provides mechanical pre-loading of the co-operating surfaces of the connection between the elongate anchoring members and said body portion so as to prevent them parting and causing fretting and loosening of said connection.

The rigid axial connections may be made in many different ways. For example, screw threaded connections with pre-loaded or locked threads may be preferred as being simple and inexpensive. The anchoring member may comprise a bolt or stud that is threaded in respective holes in both portions and is locked in each individually by means of a lock nut or set screw, or by axial abutment between the head or end of the bolt or stud and a respective one of said portions, or by a change in thread pitch. The threads in said holes may be pre-formed, in which case the thread starts may have to be matched, or may be formed by the bolt or stud itself.

According to the other aspect of the invention, the anchoring means comprises at least one strut member that extends from the crown portion into the piston body so as to absorb compressive forces therebetween and thereby relieve compressive loading of the adjacent faces of the piston body and crown portion, and at least one tie member that is connected between the piston body and crown portion to restrain separation and that is pre-loaded in tension.

The joint action of the tie member and strut member is to absorb the axial operating forces so as to maintain the crown portion fixed relative to the piston body without being dependent on inter-engagement of the adjacent faces of these components. The pre-load in the tie member maintains the crown portion in engagement with the strut member, and the strut member extends into the piston body so as to axially abut a portion of the body that is cooler in operation and can withstand the compressive forces exerted on the strut member.

The pre-load may be produced by providing a resilient strut member, for example, a resilient rod or sleeve, and compressing said member during assembly. Alternatively, separate resilient means may be provided to pre-load the tie member, for example, spring means that acts between the tie member and piston body.

The pre-load applied to the tie member may also be used to ensure that the tie member is connected securely to a retaining member that engages the piston body. For example, the tie member may be a bolt or stud that projects through a bore in the piston body and engages a threaded hole in the retaining member, the co-operating threads being locked by said pre-load to resist loosening.

DESCRIPTION OF THE DRAWINGS

The invention will now be described by way of example with reference to the accompanying drawings in which.

BEST MODE OF CARRYING OUT THE INVENTION

Figure 1:
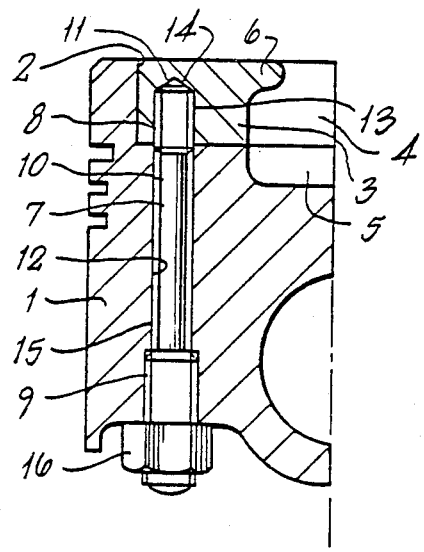
FIG. 1 is a cross section through half a piston according to one embodiment of the invention.

The piston illustrated in FIG. 1 comprises a piston body 1 cast out of aluminium-silicon alloy and having a recess 2 in the crown to receive an annular insert 3 of heat resistant material. The crown of the piston has a combustion chamber 4 formed by a recess 5 in the crown of the piston body and the central bore of the insert 3. The insert 3 is formed with an inwardly projecting annular lip 6 so as to give the combustion chamber a reentrant profile. The insert is composed of a heat resistant material so as to give the lip 6 the necessary strength to withstand the combustion chamber operating conditions. For example, the insert may be cast from a copper alloy including 0.5 percent beryllium and 2.5 percent cobalt.

The insert is secured in place in the recess 2 by two or more threaded studs 7 that extend through the piston body parallel to the piston axis and are located on diametrically opposite sides of said axis. Each stud has a threaded portion 8, 9 at each end of an intermediate plain portion 10 of a reduce diameter. One threaded end portion 8 has a tapered tip 11 and, during the assembly operation, it is threaded from the underside of the piston through a plain bore 12 in the piston body and engages a blind bore 13 in the underside of the insert. The bore 13 is of a smaller diamater than the end portion 8 of the stud and the stud is rotatably driven so that it is threaded into the bore 13, forming a cooperating thread in the wall of the bore 13 in the process. The stud is driven in this manner until its tapered tip 11 abuts the tapered end 14 of the bore 13, the loading reaction then producing a locking action between the threads.

The threaded portion 9 at the other end of the stud has a larger diameter than the end portion 8, and engages a corresponding radially enlarged portion 15 of the bore 12 at its lower end. This enlarged portion 15 of the bore is of a smaller diameter than the threaded end portion 9 of the stud, and thus the end portion 9 forms a thread in the bore 15 as the stud is rotatably driven into the bore in the same manner as end portion 8 in bore 13. Preferably, the longitudinal dimensions of the diffent portions of the stud and bore in the piston body are such that the upper threaded portion 8 commences forming a thread in the insert before the lower threaded portion 9 commences forming a thread in the piston body. The threads on the portions 8 and 9 are both of the same pitch.

Once the stud is fully inserted a locknut 16 is threaded onto the lower threaded portion 9, a loading reaction being produced between it and the underside of the piston to lock the cooperating threads of the portion 9 and bore 15, tensile strain energy being stored in the stud and compressive strain energy being stored in the surrounding piston body and lockout 16.

It will be appreciated that in the final assembled state, the insert is rigidly connected to one end of the stud and the piston body is rigidly connected to the other end of the stud. Consequently there need be no initial clamping force in the stud. In use, the stud acts alternately as a tie and strut in resisting the operating forces applied to the insert. These forces do not exceed the pre-loading forces of the locked thread connections at each end of the stud so loosening and fretting of the connections is avoided.

Figure 2:
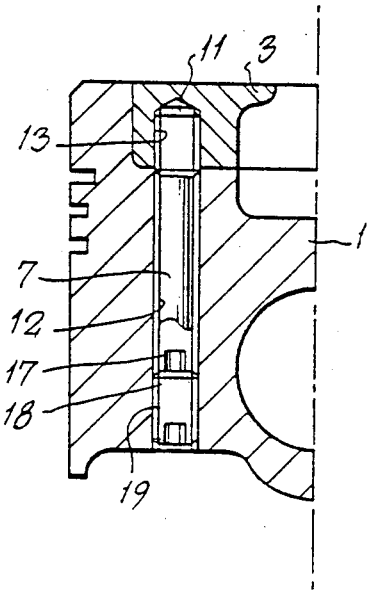
FIG. 2 is a cross section through half a piston according to a second embodiment of the invention.

A piston having a similar piston body 1 and insert 3 to that of the piston of FIG. 1, is shown in FIG. 2. Again, a pair of threaded studs 7 connect the insert to the piston body. Each stud is of a constant diameter, is threaded throughout its length and terminates in a tapered tip 11 at one end in a recessed head 17 at the other end. Each stud is rotatably driven into a bore 12 in the piston body so as to form a cooperating threaded throughout its length. The tip of the stud then engages a blind bore 13 in the underside of the insert 3, of the same diameter as the bore 12, and the stud proceeds to thread into the bore 18. Abutment of the tapered tip 11 with the tapered end of the bore 13 serves to lock the cooperating threads of the stud 7 and bore 13, as in the embodiment of FIG. 1.

The stud 7 is of a length such that its recessed head 17 lies within the bore 12 when fully inserted, the recess 18 in the head being engaged by a suitable tool such as an hexagonal key to drive the stud home. After insertion of the stud 7, a locking grub screw 19 is screwed into the bore 12 and abuts the head of the stud to lock the cooperating threads of the stud and bore 12. In this embodiment compressive strain energy is stored in the stud and grub screw 19 and tensile strain energy is stored in the surrounding body.

Figure 3:
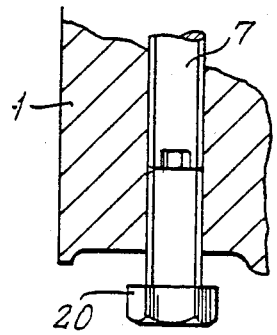
FIG. 3 is a scrap view showing a modification to the anchoring means of the piston of FIG. 2.

As an alternative to using the grub screw 19, a set screw 20 can be used as shown in FIG. 3, to lock the cooperating threads of the stud 7 and bore 12.

In another alternative embodiment of the invention, the stud 7 in FIG. 1 is replaced by a longer bolt with a similar tapered tip 11. The bolt forms threads in the bore 12 in the piston body and in the bore 13 in the inserted, as described above, but the head of the bolt is spaced away from the bottom of the piston body when the bolt is fully inserted. In order to lock the bolt in the bore 12, a lock nut 20 is provided on the bolt to be loaded against the underside of the piston body, as shown in FIG. 4.

Figures 5, 6:
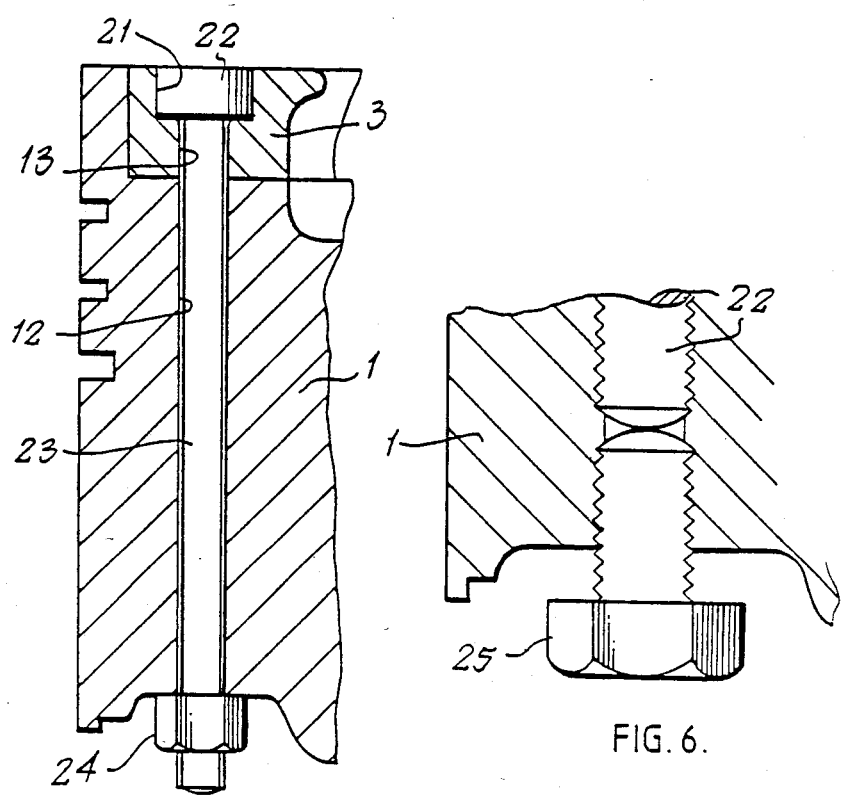
FIG. 5 is a cross section through half a piston according to a third embodiment of the invention.
FIG. 6 is a scrap view showing a modification to the piston of FIG. 5.

Another embodiment of the invention employing bolts as the anchoring means, is illustrated in FIG. 5. The piston body 1 and insert 3 can be considered to be basically the same as in the preceding embodiments but the insert is formed with a recess 21 to receive the head 22 of a bolt 23 that is threaded from the top of the piston down through the aligned bores 12, 13 in the piston body and insert 3. The bores 12, 13 are formed with a smaller diameter than the bolt 23 and the bolt is rotatably driven to form cooperating threads in the walls of the bores. The head of the bolt is loaded against the base of the recess 21 so as to lock the cooperating threads of the bolt and bore 13 in the insert. A locknut 24 is threaded onto the lower end of the bolt after insertion and is loaded against the lower face of the piston body to lock the cooperating threads of the bolt and bore 12 in the piston body, as described in relation to FIG. 1.

Figure 4:
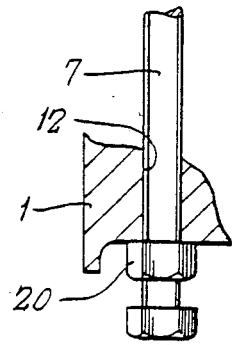
FIG. 4 shows a further modification to the anchoring means of the piston of FIG. 2.

In the embodiments of FIGS. 1, 4, and 5, the bolt 7 is tensioned by a locknut during assembly and this tends to load the inter-engaging faces of the insert and piston body. This can be avoided by providing a gap between these two faces using a suitable jig or a shim. If the shim is composed of a soft material or one that yields rapidly with rise in temperature, it may be left in place after tightening the locknut.

The embodiment of FIG. 5 may be modified by using shorter bolts 22 and locking each to the piston body using a grub screw or lock screw. FIG. 6 illustrates such a modification in which a lock screw 25 is used. This is of the same diameter as the bolt 22 and forms a cooperating thread in the bore 12 in the same manner. This lock screw 25 applies an upwards force to the end of the bolt to lock it to the piston body. This upwards force is in the same direction as the upwards reaction on the head of the bolt 22 that locks its threads in the bore 13 in the insert. Compressive strain energy is stored in the end of the bolt and lock screw 25 and tensile strain energy is stored in the surrounding piston body.

In all of the preceding embodiments where a bolt or screw or stud has been threaded in the insert or piston body this has been achieved by driving the bolt screw or stud so as to form a cooperating thread. However, it will be appreciated that in all cases pre-formed threads may be provided instead. The only difficulty will be to ensure that successive threads engaged by the bolt, screw or stud are started in the correct relationship to one another. This difficulty could be overcome by tapping the components to be threaded after they have been located in their assembled positions.

Further, when using a preformed thread in a bore in the insert or piston body it is possible to change or vary the pitch of the thread on the bolt so as to obtain an automatic locking action of the bolt when threaded into the bore. For example, the locknut 20 in the embodiment of FIG. 4 may be omitted and a performed thread with a change of variation of pitch performed on the bolt 7 to be received in the bore 12.

It should also be appreciated that, some of the preceding embodiments can be modified so that the two connections of the anchoring means to the insert and piston body can be interchanged or inverted. Also, springs or belleville washers (as described below) can be used in the preceding embodiments to assist in overcoming differential thermal expansion. Thus, for example, in FIG. 1 a spring or belleville washer could be provided between nut 16 and piston body 1 and/or between insert 3 and the end of stud 7. Such an arrangement provides the stud fixing with resilience and increased strain energy capacity.

Other alternative embodiments of the invention are illustrated in FIGS. 7 to 22 in which bolts or pins 26 are inserted through aligned plain bores 12, 13 in the piston body insert 3, and are connected to the insert and piston body by means other than direct threaded engagements.

In all cases, the heads of the bolts or pins 26 engage recesses 27 in the insert and are welded or brazed in place. This allows the insert to be thinner and lighter than when threading studs or bolts into the insert.

Figure 7:
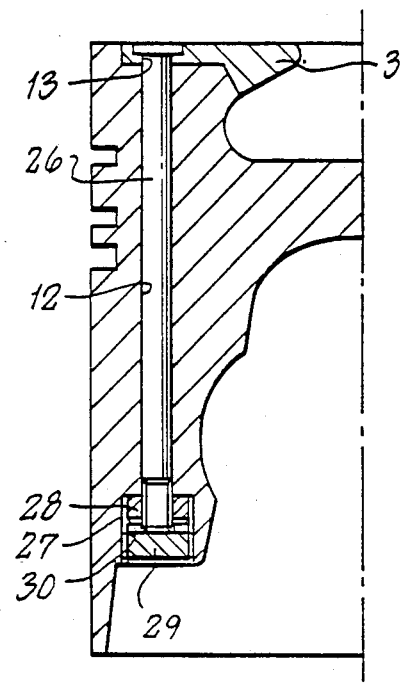
FIG. 7 is a cross section of half a piston according to the invention having anchoring means comprising a pin welded or braxed to an insert at one end and connected to the piston body by connection means at its other end.

In the embodiment of FIG. 7, the bolt 26 is formed with a thread at its lower free end and projects into an internally threaded recess 27 in the lower face of the piston body. A nut 28 is threaded onto the end of the bolt and abuts the piston body. A second nut 29 is then threaded into the recess so as to be loaded against the end of the bolt and lock the cooperating threads of The bolt and nut 28. The threads of the two nuts 28, 29 are of opposite hand and a locking washer 30 is provided between them. Alternatively, the threads of the two nuts 28, 29 could be of the same hand and locked by other means. In all cases compressive strain energy is stored in the end of the bolt 26, and the nuts 28, 29 and tensile strain energy is stored in the surrounding piston body.

Figure 8:
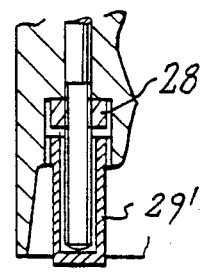
FIGS. 8 to 20 each show a scrap view of alternative connection means to that of FIG. 7 between the pin and piston body.

In order to avoid unloading of the bolt 26 due to thermal expansion, a spring member, e.g. a belleville or dished washer, may be provided between the bolt 26 and the nut 29. Alternatively, a longer bolt 26 could be used and the nut 29 modified as shown in FIG. 8 so that it has an extended cup-shaped portion $29^1$ that receives the end of the bolt and acts resiliently on it, tensile strain energy being stored in said nut.

Figure 9:
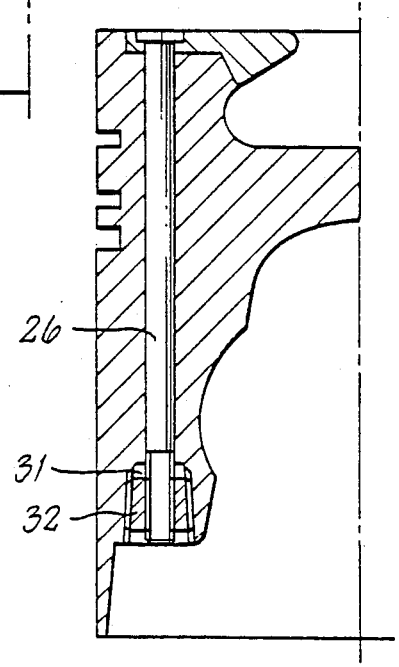

In the embodiment of FIG. 9, the bolt 26 is formed with a thread at its lower free end and projects into a frusto-conical, internally threaded recess 31 in the lower face of the piston body. A nut 32 having an outer profile of a matching frusto-conical shape and formed with an external thread of the same pitch as its internal thread, is threaded onto the bolt and simultaneously engages the internal thread of the recess, eventually locking in place in the recess. The thread starts on the bolt and in the recess have to be accurately positioned to match the thread starts on the nut 32. The nut 32 may be slit, at least partially, to allow radial gripping movement of the threads.

Figure 10:
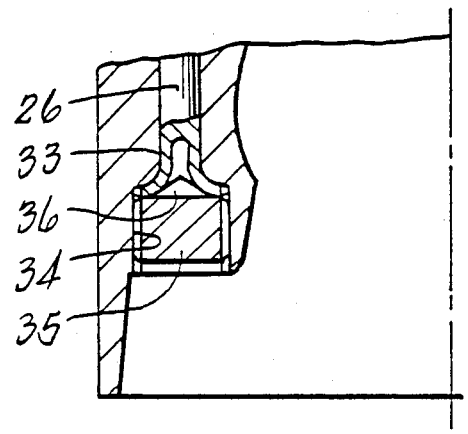

In the embodiment of FIG. 10, the lower end of pin 26, after insertion through the bores 12, 13 is swaged open within a recess 34 formed in the lower face of the piston body. The recess is threaded internally and a set screw 35 with a conical end 36 is threaded into the recess so that the conical end clamps the swaged portions of the pin against the bottom of the recess. Compressive strain energy is stored in the shaped end of the pin and the screw 35, and tensile strain energy is stored in the surrounding piston body. Spring means such as a belleville washer may be inserted between the screw 35 and swaged end of the pin 26 to increase the pre-loading.

Figure 11:
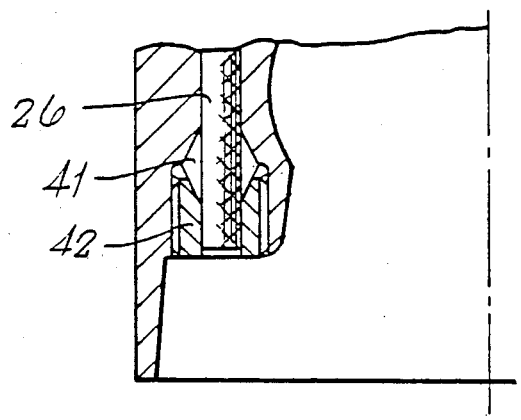

In the embodiment of FIG. 11, the lower end of the pin 26 projects into internally threaded recess 40 in the lower face of the piston body. An olive 41 is inserted over the pin and a nut 42 is threaded into the recess over the end of the pin and acts upon the olive to deform it axially against the bottom of the recess and cause it to grip the pin. Preferably, the end of the pin is knurled or serrated so as to allow more positive gripping by the olive. Spring means such as a belleville washer may be inserted between the nut 42 and the olive 41.

Figure 12:
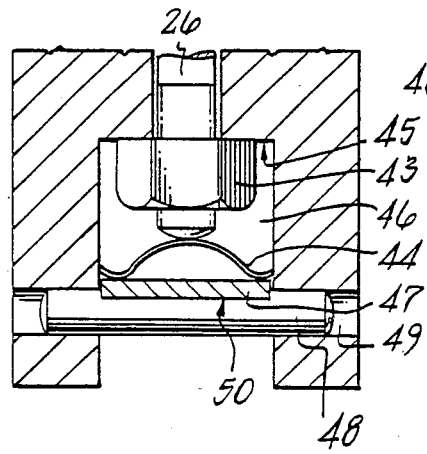
Figure 15:
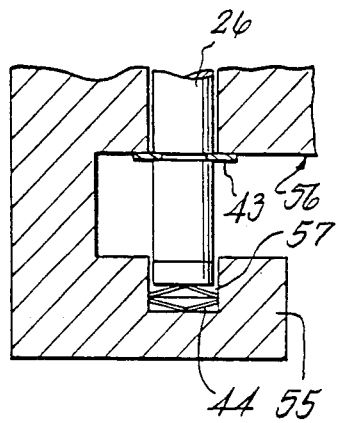
Figure 16:
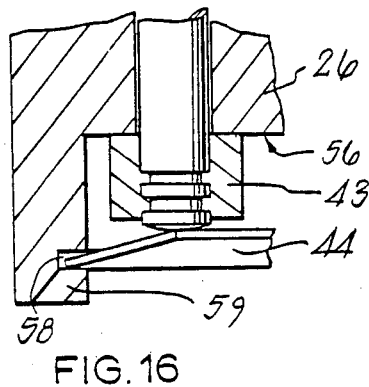
Figure 17:
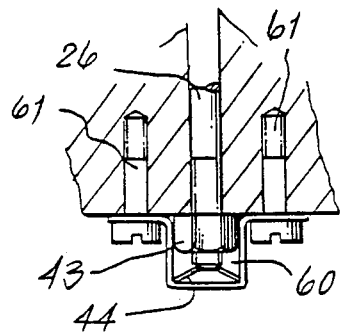

The embodiments illustrated in FIGS. 12 and 17 each has a connection between the lower end of the pin 26 and the piston body comprising an abutment 43 on the pin and separate spring means 44 that acts between the pin 26 and the piston body to load the abutment upwards into engagement with a lower abutment face on the piston body. The abutment 43 may comprise a locknut as shown in FIGS. 12 to 14 and 17 or a circlip as shown in FIG. 15 or a swaged collar as shown in FIG. 16.

FIG. 12, the spring means 44 comprises a curved spring water that acts axially against the lower end of the pin 26 so as to urge the nut 43 upwards into engagement with a lower face 45 of the piston body. The washer is supported in a circular recess 46 in the piston body on a support disc 47 that is held in place by a pin 48 that is inserted through a transverse hole 49 in the piston body between opposite walls of the recess 46. The pin 48 is formed with a flat 50 in which the disc 47 is engaged by the spring washer 44 to lock the pin in place. In an alternative arrangement the spring washer 44 may be replaced by a belleville washer.

Figure 13:
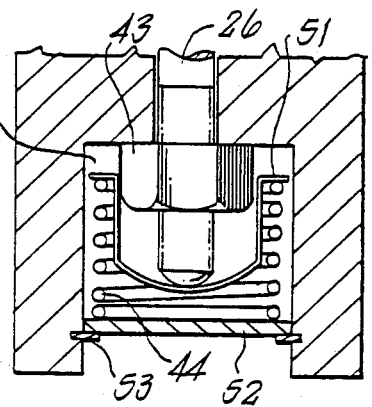

In FIG. 13, the spring means 44 comprises a coiled compression spring that is located in a pocket 46 and acts upon the lower end of the pin 26 through the medium of a pressed cup 51 that fits over the end of the pin and nut 43. The coil spring 44 is supported on a disc 52 that is held in the pocket 46 by a circlip 53, and acts upon the pin to urge the nut 43 upwards into engagement with the bottom of the recess.

Figure 14:
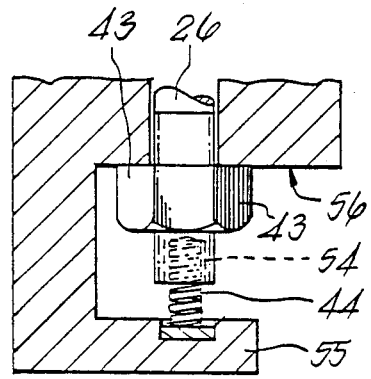

In FIG. 14, the spring means 44 comprises a spring rod that axially engages within a bore 54 in the end of the pin 26 and engages a reaction member 55 connected to the piston body so that the spring rod 44 urges the nut 43 into engagement with the lower face 56 of the piston body.

In FIG. 15, the spring means 44 comprises belleville washers that are located in a pocket 57 of a reaction member 55 connected to the piston body and act upon the lower end of the pin 26 to urge the circlip upwards into engagement with the lower face 56 of the piston body.

In FIG. 16, the spring means 44 comprises a belleville washer that engages in an annular groove 58 in a skirt 59 projecting downwards around the lower end of the piston body, the washer 44 acting upwards against the lower end of the pin 26 to urge the collar 43 into engagement with the lower face 56 of the piston body.

In FIG. 17, the spring means 44 comprises a belleville washer that engages between the head of the pin and a housing 60 that engages over the head of the pin and nut 43 and is connected by screws 61 to the lower face of the piston body.

Figure 18:
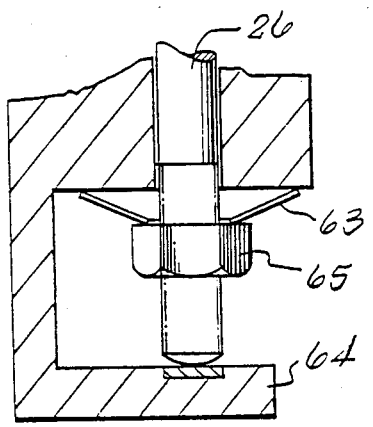
Figure 19:
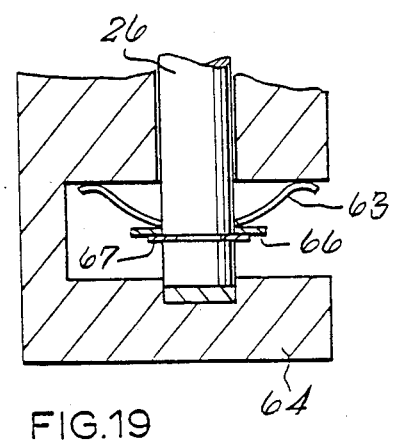

FIGS. 18 and 19 illustrate embodiments in which spring means 63 is provided that acts upon the pin 26 so as to urge it downwards into engagement with a thrust member 64 that is connected to the lower end of the piston body. In FIG. 18, the spring means 63 is a belleville washer located on the pin 26 and acting between a lower face of the piston body and a nut 65 threaded on the pin so as to urge the lower end of the pin into engagement with the thrust member 64. In FIG. 18, the nut 65 is replaced by a washer 66 and circlip 67.

Figure 20:
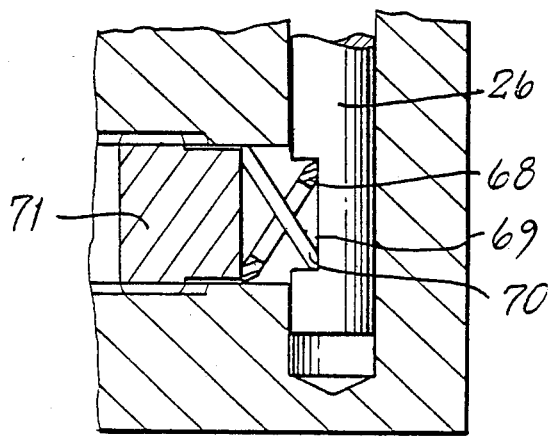

The embodiment illustrated in FIG. 20 also employs spring means to urge the pin 26 into engagement with a fixed abutment. In this case the spring means comprises a ring member 68 that engages one end of a notch 69 in the side of the pin, and which is arranged in a crossover relationship with a rigid abutment member 70 that engages the other end of the notch 69. Both ends of the spring 68 and the abutment 70 spaced away from the notch engage a common clamping screw 71 so that movement of the screw 71 towards the notch produces a scissor action between the spring and abutment, the spring being compressed and acting to urge the pin in one direction against the bracing action of the abutment.

Figures 21, 22:
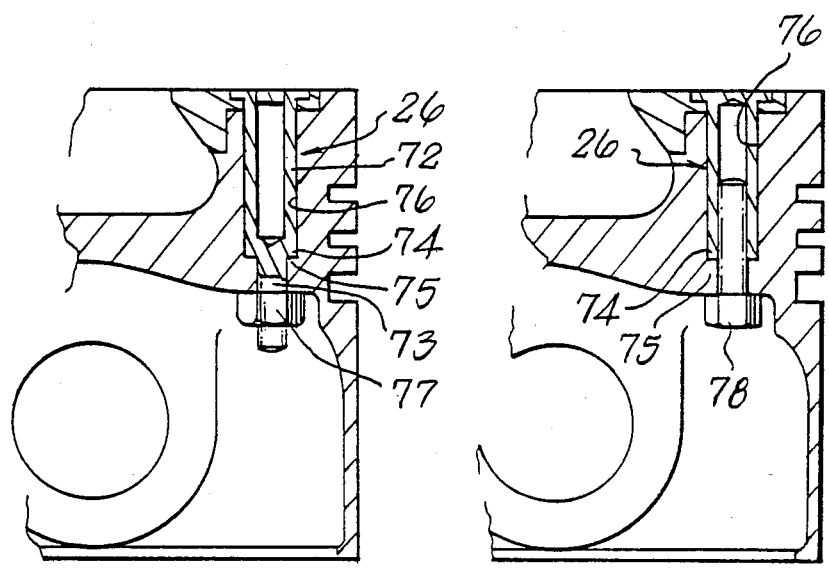
FIG. 21 is a cross section of half a piston according to the invention having anchoring means comprising a pin with a clamp type connection between the pin and piston body.
FIG. 22 is a view showing an alternative clamp type connection to that of FIG. 21.

In the embodiment of FIG. 21, the pin 26 is formed with a tubular shank 72 and a threaded end portion 73 of reduced diameter with a shoulder 74 therebetween that engages an annular ledge 75 within the lower end of a dual diameter bore 76 formed through the piston body to receive the pin. A nut 77 is threaded onto the end portion of the bolt and tightened against the lower face of the piston body so that the shoulder 74 is clamped against the ledge 75, a compressive pre-load being applied to that portion of the piston between the shoulder 74 and nut 77 and a tensile pre-load being applied to the end portion 73 of the pin between the shoulder 74 and nut 77. The reaction on the nut 77 serves to lock in to the pin.

In the embodiments of FIG. 22, the pin 26 is tubular and is formed with an internal thread to receive a set screw 78 that is engaged from the underside of the piston body. This arrangement is equivalent to that of FIG. 21 in that the screw 78 acts like the nut 77 to clamp the lower end of the pin at 74 against an annular ledge 75 within the dual diameter bore 76 formed through the piston body.

The embodiments of the invention now to be described in relation to FIGS. 23 to 27 each employ anchoring means comprising at least one strut member 79 that extends from the insert 3 into the piston body to absorb compressive forces therebetween and at least one tie member 80 that is connected between the piston body and insert to restrain separation and that is preloaded in tension.

Figure 23:
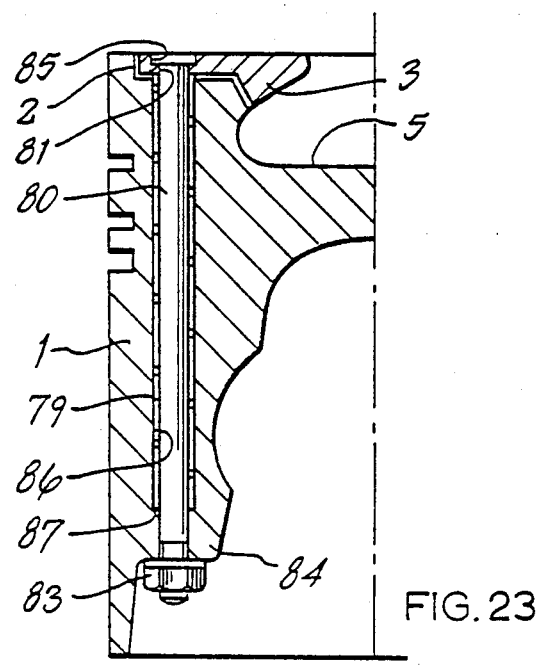
FIG. 23 is a cross section of a half a piston according to the invention having anchoring means comprising separate coaxial tie and strut members.

In FIG. 23, the insert 3 is secured in place in the recess 2 by a number of tie bolts 80 that each project downwards through a bore 81 in the insert and a bore 82 in the piston body 1 and have a nut 83 threaded onto their lower end so as to abut a lower shoulder 84 of the piston body. The head of the bolt may be loosely received in a recess 85 in the upper face of the insert or may be welded or brazed in place in said recess.

The bore 82 in the piston body is enlarged radially over the larger part of its length from the upper end downwards so as to leave an annular space 86 around the bolt 80 that receives a resilient sleeve 79 between the lower face of the insert 3 and the annular shoulder 87 where said annular space terminates. This sleeve 79 can be composed of a rectangular section strip that is helically wound or can be a slotted tube, and is stiff enough to withstand the compressive operating loads applied between the insert and piston body. During assembly, the sleeve 79 is compressed axially by the bolts 80 as the nuts 83 are tightened, thereby pre-loading the bolts with a tensile force and the sleeve with a compressive force. The compressive force in the sleeve counteracts the inertia forces exerted on the insert at bottom dead centre and also serves to lock the nut 83 on the bolt 80, thereby resisting loosening of the nut.

Figure 24:
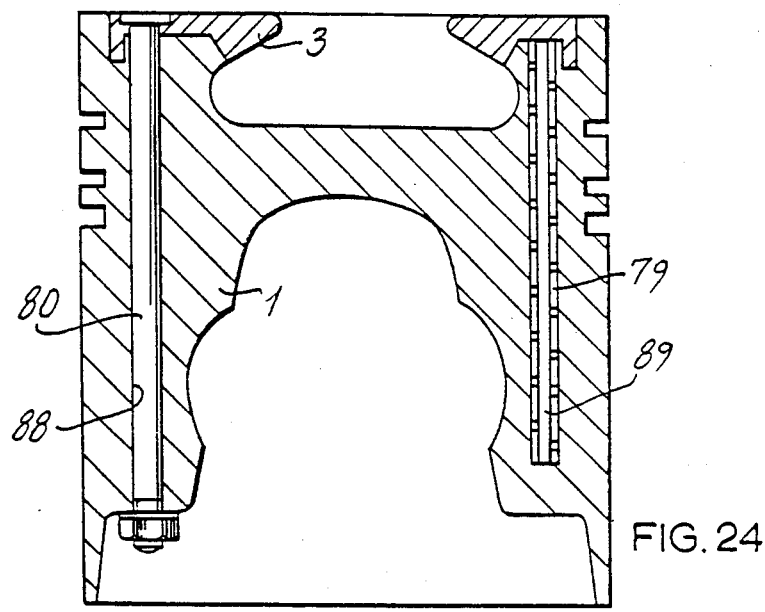
FIGS. 24 to 27 each show an axial section of a piston according to the invention having anchoring means comprising separate spaced apart tie and strut members.

The piston illustrated in FIG. 24 is similar to that of FIG. 23 except that the bolt and resilient sleeve are each located in a separate bore, the bolt 80 being received in a uniform bore 88 and the sleeve 79 being received in a blind bore 89 that opens upwards beneath the insert. The bolt and spring may be located close to one another, or may be widely spaced apart. For example, two bolts may be located diametrically opposite one another and the corresponding pair of resilient sleeves may be located diametrically opposite one another on the perpendicular bisector therebetween.

Figure 25:
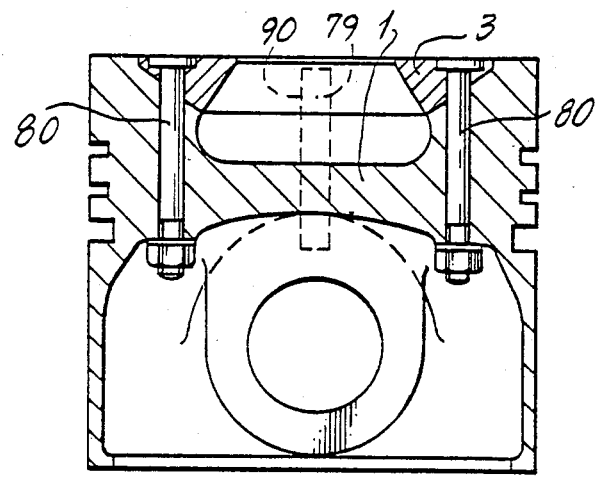

The piston illustrated in FIG. 25 is similar to that of FIG. 23 except that the insert and piston body are of a different shape, and the resilient sleeve 79, instead of abutting the underside of the insert, is received in a blind bore 90 in its underside. A pair of bolts 80 are shown spaced diametrically opposite one another with the corresponding pair of resilient sleeves arranged diametrically opposite one another on the perpendicular bisector therebetween.

Figure 26:
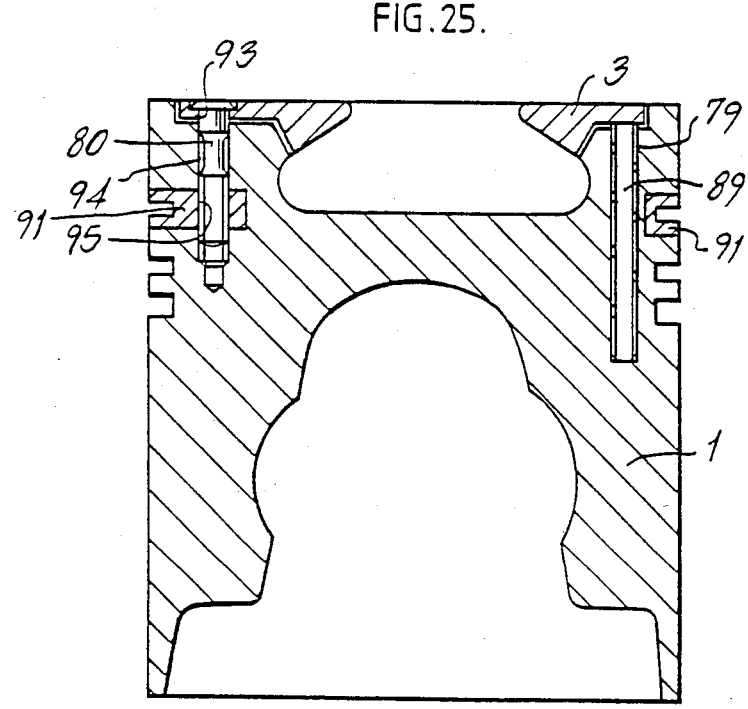

The piston illustrated in FIG. 26 has a piston body 1 and insert 3 similar to those in FIG. 1 and includes ring armour 91 in the outer piston wall. Tie members 80 in the form of screws are each inserted through a bore 93, in the insert 3 into a bore 94 in the piston body and engages a tapped hole 95 in the ring armour. The screws 80 may have break-away heads or may be locked by peening. The ring armour may be enlarged radially inwards to accommodate each tapped hole 95, as shown in FIG. 26.

Resilient sleeves 79 are provided in separate blind bores 89 in the piston body as in the piston of FIG. 24. The bores 89 are located inwards of the ring armour 91. Alternatively, the resilient sleeves 79 may be arranged coaxially with the screws 80 in the manner of the bolts 80 and sleeves 79 in FIG. 23.

In all of the aforesaid embodiments in which the resilient sleeves are located in separate bores in the piston body, they may be replaced by solid resilient rods or even non-resilient rods. In the latter case, some resilience may be provided by the rest of the assembly. Alternatively a solid rod can be provided in the upper end of the bore above the resilient sleeve, or the upper end of the sleeve can be made solid so that it is more resistant to heat. Also, where a resilient sleeve is located in a separate bore its centre may be plugged so as to reduce the gas capacity of the bore.

Figure 27:
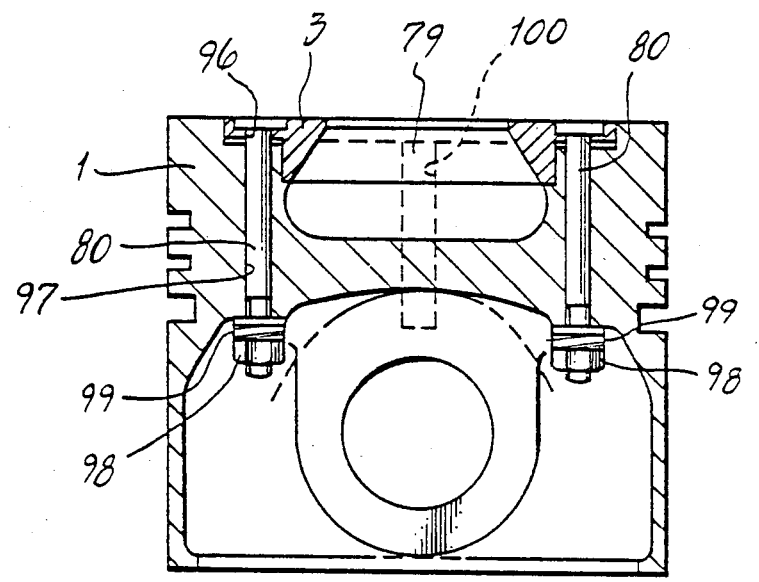

The piston illustrated in FIG. 27 comprises a piston body 1 and insert 3 similar to those in FIG. 25. A pair of bolts 80 are inserted through bores 96, 97 in the insert and piston body and engage nuts 98 to secure the insert to the piston body. A resilient member 99, such as a helical spring or belleville washer, is provided on the lower end of each bolt so as to be compressed between the nut 98 and the underside of the piston body, and thereby pre-load the bolt and urge the insert 3 downwards towards the piston body 1. However, the insert is not clamped against the top of the piston body, but is clamped against struts 79 that are located in blind bores 100 in the piston body. These struts may be solid or tubular rods that project slightly out of the top of the bores 100 and extend downwards to a cool part of the piston body that can best withstand the operating loads exerted through the struts. As shown in FIG. 27, a pair of bolts 80 are located diametrically opposite one another and a pair of struts 79 are located diametrically opposite one another on the perpendicular bisector between the bolts 80.

In all of the embodiments of Figures the piston body and insert are manufactured as separate components and then assembled together. However, in other embodiments it is possible that the piston body may be cast around the insert or vice versa and the anchoring means fitted afterwards to connect them together. For example, holes and recesses could be bored in the assembly to receive any of the stud, bolt or pin type anchoring means illustrated in the drawings.

Typically, in the pistons illustrated, the service temperature at the crown 3 is approximately 350 degrees centigrade and the temperature distribution is known to be such that in the region of the piston ring grooves the temperature is approximately 230 degrees centigrade and in the region in which the anchoring means is connected to the piston body, the temperature is normally less than 230 degrees centigrade and may be less than 150 degrees centigrade. From the creep properties of the alloy it is known that creep properties of the aluminium silicon alloy used is negligible at the temperatures likely to be encountered in the region where the anchoring means is connected to the piston body. Thus loosening of the anchoring means by thermal yielding is avoided.

We claim:

1. A piston for an internal combustion engine comprising a piston body and a crown portion connected by anchoring means that transmits tensile and compressive loads from the crown to a portion of the piston body; the anchoring means comprising a number of elongate members each extending through a bore in the piston body, first connection means rigidly axially connecting one end of each elongate member to the crown portion, and second connection means rigidly axially connecting the other end of each elongate member to said portion of the piston body and comprising cooperating surfaces associated with said elongate member and said portion of the piston body; and preloading means being provided that acts between said elongate member and piston body to produce strain energy that is stored in the anchoring means and piston body and acts axially to prevent parting of said cooperating surfaces of said second connection means.

2. A piston as claimed in claim 1 in which said second connection means comprises a screw threaded connection with threads preloaded by said preloading means.

3. A piston as claimed in claim 2 in which said elongate member is a headed bolt that is rigidly connected to one of said crown and body portions by being screw threaded therein and by abutment of the head with said one portion to lock the engaging threads, thereby to form one of said first and second connection means, respectively.

4. A piston as claimed in claim 3 in which the bolt is screw threaded in the other of said crown and body portions and the threads locked, by said preloading means.

5. A piston as claimed in claim 4 in which said preloading means comprises a threaded locking member.

6. A piston as claimed in claim 3 in which the head of the bolt engages a recess in the crown portion and abuts the bottom of the recess to form said first connection means.

7. A piston as claimed in claim 2 in which the elongate member is a stud that is rigidly connected axially to one of said crown and body portions by being screw threaded in a blind hole therein and by abutment of the leading end of the stud with the end of said hole, thereby to form one of said first and second connection means, respectively.

8. A piston as claimed in claim 7 in which the stud is screw threaded in the other of said crown and body portions and the threads locked by said preloading means.

9. A piston as claimed in claim 8 in which said preloading means comprises a threaded locking member.

10. A piston as claimed in claim 7 in which the stud is screw threaded in a blind hole in the underside of the crown portion to form said first connection means.

* * * * *